(12) United States Patent
Hartshorne et al.

(10) Patent No.: US 7,992,142 B2
(45) Date of Patent: Aug. 2, 2011

(54) COMMUNICATIONS NETWORKS

(75) Inventors: Paul Hartshorne, Wollaton (GB); Jonathan Munns, West Brideford (GB); Timothy Hunneyball, Gedling (GB)

(73) Assignee: Ericsson, AB, Stockholm (SE)

( * ) Notice: Subject to any disclaimer, the term of this patent is extended or adjusted under 35 U.S.C. 154(b) by 962 days.

(21) Appl. No.: 10/491,257

(22) PCT Filed: Oct. 4, 2002

(86) PCT No.: PCT/GB02/04541
§ 371 (c)(1), (2), (4) Date: Dec. 20, 2004

(87) PCT Pub. No.: WO03/029969
PCT Pub. Date: Apr. 10, 2003

(65) Prior Publication Data
US 2005/0108288 A1    May 19, 2005

(30) Foreign Application Priority Data
Oct. 4, 2001  (GB) .................................. 0123861.7

(51) Int. Cl.
G06F 9/44      (2006.01)
G06F 9/445     (2006.01)
G06F 15/16     (2006.01)

(52) U.S. Cl. ......... 717/173; 717/178; 709/203; 709/219
(58) Field of Classification Search .................. None
See application file for complete search history.

(56) References Cited

U.S. PATENT DOCUMENTS

| | | | |
|---|---|---|---|
| 5,008,814 A | 4/1991 | Mathur | |
| 5,450,589 A * | 9/1995 | Maebayashi et al. | 717/170 |
| 5,689,640 A | 11/1997 | Okanoue | |
| 5,909,581 A | 6/1999 | Park | |
| 6,018,773 A * | 1/2000 | Watanabe | 709/239 |
| 6,151,643 A * | 11/2000 | Cheng et al. | 710/36 |
| 6,233,730 B1 * | 5/2001 | Todd et al. | 717/108 |

(Continued)

FOREIGN PATENT DOCUMENTS

EP    0 687 975 A1    12/1995

(Continued)

OTHER PUBLICATIONS

ANTS: A toolkit for Building and Dynamically Deploying Network Protocols, David J Wetherall, et al., 1998 IEEE 03, Apr. 1998, pp. 117-129.

(Continued)

*Primary Examiner* — Tuan Q Dam
*Assistant Examiner* — Hanh T Bui
(74) *Attorney, Agent, or Firm* — Kirschstein, et al.

(57) ABSTRACT

In order to upgrade firmware at network elements in a communications network a network upgrade protocol agent is installed on each network element. These agents run an upgrade protocol which allows an upgrade to be loaded onto a first network element and then broadcast through the network. The protocol includes notification messages, which change the state of the network elements to which the upgrade relates, download messages which include the firmware upgrade, apply messages which instruct relevant network elements to apply the upgrade, and inventory messages which send an inventory of firmware stored at a network element to neighboring elements to enable a determination to be made of whether a network element has received all relevant firmware upgrades.

15 Claims, 3 Drawing Sheets

U.S. PATENT DOCUMENTS

| | | | |
|---|---|---|---|
| 6,289,511 B1* | 9/2001 | Hubinette | 717/173 |
| 6,966,058 B2* | 11/2005 | Earl et al. | 717/171 |
| 7,162,538 B1* | 1/2007 | Cordova | 709/238 |
| 7,469,405 B2* | 12/2008 | Foulger et al. | 718/100 |
| 2002/0083431 A1* | 6/2002 | Machida | 717/174 |
| 2002/0087961 A1* | 7/2002 | Dorricott | 717/168 |
| 2002/0092008 A1* | 7/2002 | Kehne et al. | 717/168 |
| 2002/0092010 A1* | 7/2002 | Fiske | 717/168 |
| 2002/0163912 A1* | 11/2002 | Carlson | 370/392 |
| 2003/0225898 A1* | 12/2003 | Saika et al. | 709/229 |
| 2004/0068721 A1* | 4/2004 | O'Neill et al. | 717/168 |
| 2005/0028173 A1* | 2/2005 | Aiba | 719/327 |
| 2005/0033728 A1* | 2/2005 | James et al. | 707/1 |
| 2005/0193385 A1* | 9/2005 | de Heer et al. | 717/168 |
| 2006/0130046 A1* | 6/2006 | O'Neill | 717/168 |

FOREIGN PATENT DOCUMENTS

| | | |
|---|---|---|
| GB | 2 348 721 A | 10/2000 |
| JP | 2000 067021 | 3/2000 |
| WO | WO 96/24231 | 8/1996 |

OTHER PUBLICATIONS

The DARPA Packet Radio Network Protocols, John Jubin, et al., Proceedings of the IEEE, vol. 75, No. 1, Jan. 1987, pp. 21-32.

* cited by examiner

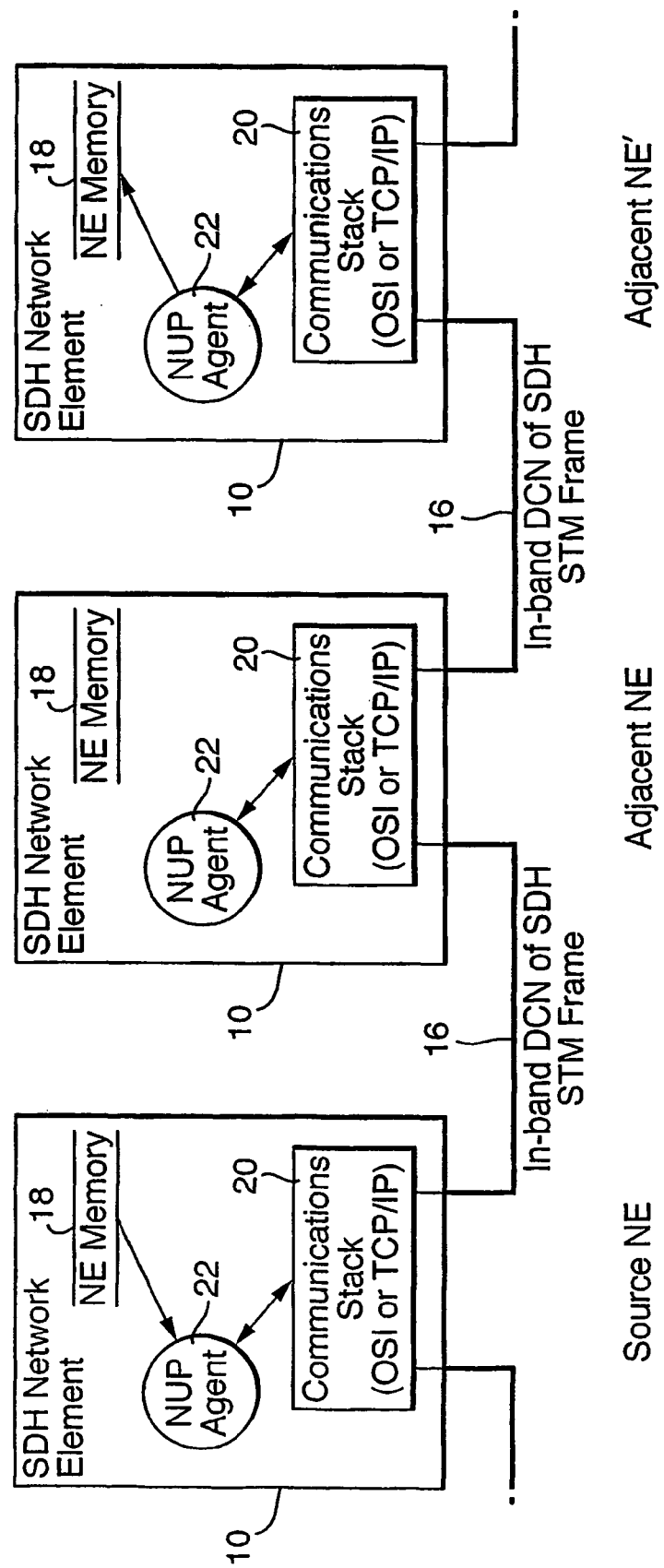

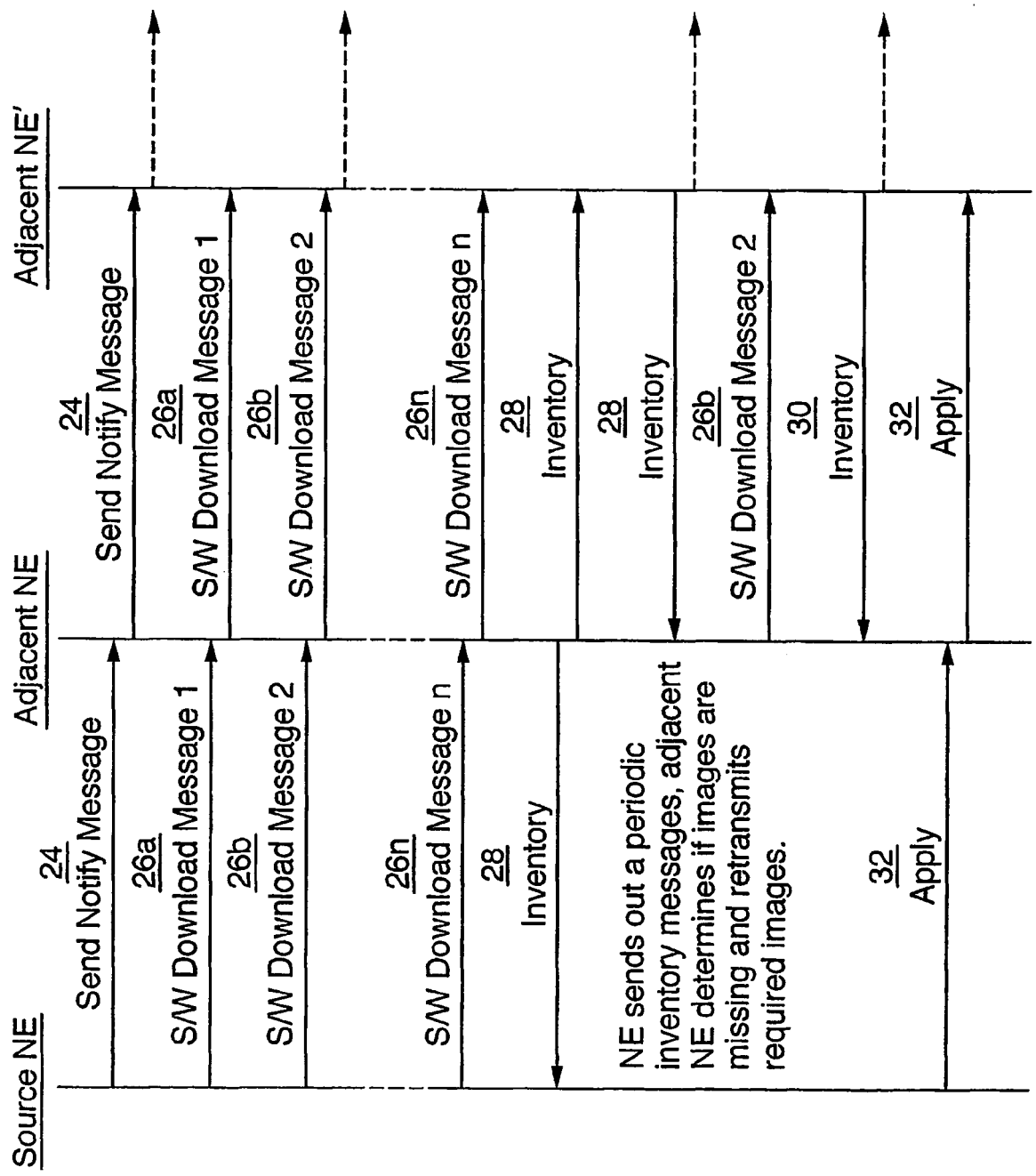

COMMUNICATIONS NETWORKS

This invention relates to communications networks and, in particular, to the updating of software/firmware installed at various elements of the network.

Many types of telecommunications networks exist including conventional PSTNs, SDH (Synchronous Digital Hierarchy), SONET (Synchronous Optical Network), Photonics, and ATM (Asynchronous Transfer Mode). Typically these networks comprise a large number of interconnected Network Elements. Within any network there will be Network Elements that are of the same make, model and version of hardware as well as firmware. The Network Elements are interconnected in one of a number of configurations including ring, star, mesh or serial by an in-band: Data Communications Network.

FIG. 1 shows a typical SDH network in which four Network Elements 10 are interconnected in a ring configuration. An element manager 12 is connected to one of the Network Elements and a notebook or other PC 14 is connected to another Network Element. The Network Elements are interconnected by a data communications channel.

To upgrade the firmware or software at any Network Element, and the term firmware will be used hereafter to refer to firmware or software, each Network Element must be upgraded in turn by the user either remotely, for example from the element manager or locally by plugging in the notebook 14 to a given element. The notebook may also be used for remote upgrades. Element managers upgrade Network Elements using batching mechanisms which execute serially and is therefore very time consuming. For example, the UK national network has in the order of 12,000 Network Elements and takes over six months to upgrade. Clearly this is vastly time consuming and expensive. As a result, upgrades are only performed when it is absolutely necessary and all but the most major enhancements are not implemented. As a result, the full capability of the network is not realised and some minor enhancements are not worth incorporating.

The invention aims to overcome this disadvantage and to prove a system and method which can greatly reduce the time taken to upgrade a communications network.

In its broadest form, the invention resides in broadcasting upgrades from a first Network Element to other Network Elements to which the upgrades are relevant.

More specifically there is provided a method of upgrading firmware installed on network elements of a communications network comprising: loading the firmware upgrade onto a source network element on the network; and broadcasting the upgrade through the network to network elements to which the firmware upgrade applies;

wherein the step of broadcasting the firmware upgrade comprises sending a notification message identifying the network element type to which the upgrade applies to network elements adjacent the source network element, and broadcasting the notification message through the network by each network element receiving the notification message passing it to adjacent network elements.

The invention also provides a method of upgrading firmware installed on network elements of a communications network comprising; installing a protocol agent on each network element for running a network upgrade protocol;

installing the firmware upgrade at a source network element; and broadcasting the firmware upgrade through the network to network elements to which the firmware upgrade applies by applying the network upgrade protocol at each network element;

wherein the step of broadcasting the firmware upgrade comprises sending a notification message identifying the network element type to which the upgrade applies to network elements adjacent the source network element, and broadcasting the notification message through the network by each network element receiving the notification message passing it to adjacent network elements.

The invention also provides a communications network comprising a plurality of network elements, each network element having a network upgrade protocol element for receiving network upgrade messages from adjacent network elements, broadcasting received network upgrade messages to adjacent network elements, and upgrading the network elements firmware according to the content of the network upgrade message; in which the network upgrade messages comprise an identifier of network element types to be upgraded.

The invention further provides a network element for a communications network, comprising a network upgrade protocol agent for receiving network upgrade messages from one or more adjacent network elements on a communications network, for broadcasting received network upgrade messages to adjacent network elements on a communications network and for upgrading the network element firmware according to the content of the network upgrade message;

in which the network upgrade messages comprise an identifier of network element types to be upgraded.

The invention further provides a network upgrade protocol for upgrading firmware stored in network elements of a communications network, the protocol comprising a notification message identifying the network elements to be upgraded, a download message for downloading the upgrade to the identified network elements, and an apply message for causing network elements which have received the firmware upgrade to apply the upgrade.

Embodiments of the invention have the advantage that the time taken to perform an upgrade to a number of elements on a network is greatly reduced. For example, for the UK network referred to previously, the time may be reduced from over six months by a very significant amount, perhaps to even less than one day. While this reduction is clearly advantageous in reducing the cost of upgrades it is also advantageous as it allows upgrades to be performed more often, thus enabling minor upgrades to be performed frequently without having to wait for a major upgrade which might be a matter of years.

A firmware upgrade may contain firmware for a number of different functions at a network element. Preferably a firmware upgrade image is subdivided into a plurality of subimages according to the network element function to which they relate. This has the advantage that even if the firmware download is segmented by the transportation mechanism. A Network Element can be selective about what firmware it receives, according to its requirements. This reduces the processing load on the network element.

Preferably, an inventory message is periodically broadcast from a network element to adjacent network elements which lists the firmware stored at that network element, the adjacent network elements compare the received firmware list with their own firmware lists and indicate to the sending Network Element the identity of any firmware on the received list but not on its own list, the missing firmware is then sent to the receiving network agent. This has the advantage of providing a very economical method of assuring reliability of broadcasts. The alternative is to acknowledge every message sent which has a high impact on the communications network load and download time.

Embodiments of the invention will now be described, by way of example only, and with reference to the accompanying drawings, in which:

FIG. 1, referred to earlier, shows an example of network elements on a ring;

FIG. 2, shows a number of network elements embodying the present invention; and

FIG. 3, shows the message flow in a process embodying the invention.

Figure 1:
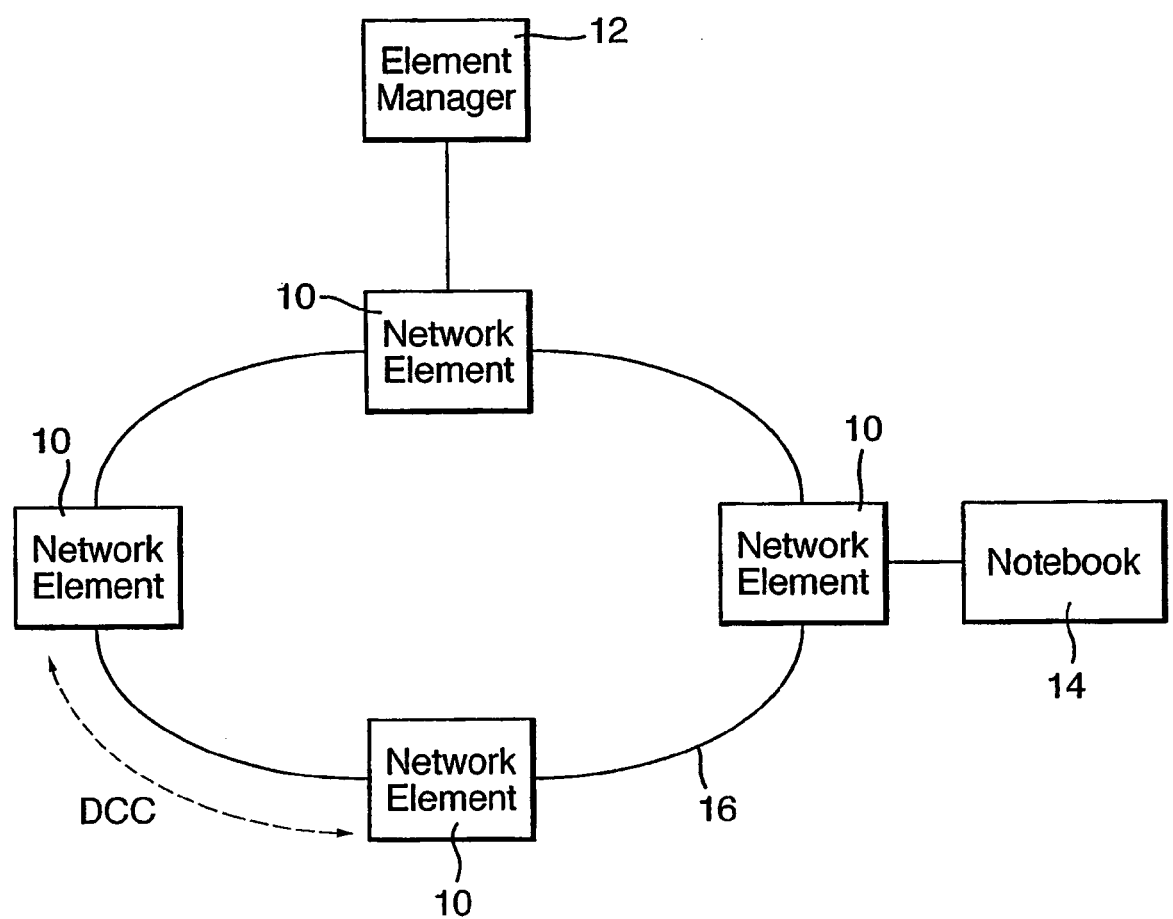

In the system and method to be described, firmware upgrades are performed by flooding the firmware throughout the network. In non-serial networks, network elements are upgraded in parallel. The description that follows relates to an SDH network but the invention is applicable to any telecommunications network. Similarly, the following description refers to TCP/IP stacks although other stacks, such as OSI communications stacks may be used. FIG. 2 shows three network elements 10 interconnected by a in-band data communications channel 16. Each network element is conventional and includes memory 18 and a communications stack 20. Each network element also includes an NUP (Network Upgrade Protocol) Agent 22 which is downloaded to each Network Element using conventional upgrade techniques and which comprises software that implements a network upgrade protocol embodying the invention. The NUP Agent handles the receiving and distribution of NUP protocol messages. The NUP Agent allows a system user, via a command line or other user interface, to configure and inform the NUP agent 22 to broadcast the network element firmware image.

An upgrade is performed by first upgrading a first source, network element (NE) 10 using the notebook 14 or element manager 12 as described with respect to FIG. 1. The process is the same as known techniques. When this upgrade is complete, the user instructs the first, upgraded, NUP agent 22 to start the distribution process. This instruction may happen anytime after the source NUP agent 22 has been upgraded.

The NUP Agents 22 in each NE 10 can occupy a number of states including "listen", "receive" and "broadcast only". To distribute an upgrade that has been received at the source NUP Agent 10, the source NUP agent 22 switches to the "broadcast only" state and sends out a notification message informing its adjacent NEs that a firmware update is about to occur. The notification message includes a header having addressing that signifies the make and model and version of equipment that should accept the subsequent messages. Destination NEs that match this addressing switch from a "listen" state which is the default state to a "receive" state. NEs that do not match remain in the "listen" state.

After notification, the source NUP agent 22 broadcasts the firmware images listed in the notification using the NUP downloaded messages. This message is analogous to an IS-IS link state packet message.

Any NUP Agent 22 in the "receive" state will store the downloaded firmware images in their memories 18.

When an NE 10 has the firmware inventory prescribed in the notification message, the NE must be instructed to switch to the new firmware. This may be done in two ways. The first is to have the instruction in the notification message and the second uses a separate apply message. The former approach applies the new firmware as soon as all the firmware has been downloaded. The second allows the switch over to be deferred until a later time. This is achieved by an "applystate" flag which is set by the NUP agent 22 to "pending".

Once a download is completed, whether applied or not, the NUP agent 22 reverts to the "listen" state.

During periods of NUP message inactivity the NEs NUP agent issues an inventory message to its adjacent NEs. This may indicate that firmware is missing. This can occur, for example, if a download to an NE has not been possible, for example if it was not in a "receive" state when the original notification message was sent. This message is analogous to an IS-IS sequence number packet message. On detection of missing firmware, an NE of the same make/model and version will send a download message to the NE with the missing firmware.

In some network scenarios there will exist islands of specific Network Element types that are separated by NEs of other types. This might imply that islands of the same type will not be able to send and receiving inventory messages to and from remote islands. This is not the case. As previously stated, any message received that is not for itself will be forwarded on to the adjacent Network Element, and will eventually be received by a NE of the same type or die at the terminating NEs. Once received by the remote island of the same type, a reply can be sent and any missing firmware downloaded to the NE that sent the request.

FIG. 3 shows the message flow in the process described. The figure shows messages sent from a source network element to an adjacent network element and from that network element to a further network element adjacent the second, adjacent network element. The figure is greatly simplified from a real case for ease of understanding as each network element will send messages to more than one other element to broadcast through the network.

Thus, in FIG. 3 the source NE sends a "send notify" message 24 which is sent through the network of network elements. This is followed by a number of software download messages shown as "S/N download message 1" to "S/N download message n", 26 a to 26 n. These software download messages are distributed and to all the network elements until complete.

Periodically a network element, here the middle of the three shown, will send out an inventory message 28 to adjacent network elements. The inventory specifies what images should have been received by the adjacent network elements. In the example given, the source NE is sent the inventory message but, as the originating element will not have received anything from the middle element and does not need to send an inventory message. However, the other adjacent element, identified as adjacent NE, sends its own inventory message 28 from which the middle NE determines that the images in S/N download message 2 are missing. The middle network element retransmits the missing images 26b to adjacent NE. A further inventory message 30 sent from the adjacent NE to the middle NE informs that the adjacent NE has received all the required images.

Finally, when the software upgrade that has been sent through the network is to be applied, an apply message 32 is sent from the source NE to the adjacent NE and on to the next adjacent NE' and so through the network.

The following pseudocode explains the operation of the NUP agents. In order to increase clarity, some of the exception handing has been omitted.

```
While (NUP Agent running ) {
    NUPState = Listen;
    ApplyState = NotSet;
    If (User instigates download) {
        NUPState = BroadcastOnly;
        Generate jobIdentifier;   \\ Used to group NUP messages
                                     against a one user transaction
        If (User indicated immediate Apply) {
            Send NUP Notification to all adjacent NE's with
```

-continued

```
ApplyImmediately           flag set and jobIdentifier;
    }
        else {
            Send NUP Notification to all adjacent NE's with
            ApplyImmediately flag not set and jobIdentifier;
            ApplyState = Pending;
        }
        for each card Firmware image {
            Send NUP Download Messages to adjacent NEs with
jobIdentifier;
        }
        NUPState = Listen;
    }
    if (User instigates Apply && ApplyState == Pending) {
        Send NUP Apply to adjacent NEs with jobIdentifier;
    }
    Listen for incoming NUP messages
    If (NUP Message Received) {
        If (NUP Message Received == Notification) {
            if ((Notification Addressing == NE Addressing) &&
            (NUPState != Receive) || (NUPState != BroadcastOnly)) {
                NUPState = Receive;
                JobIdentifier = JobIdentifier from message;
            }
        }
        if ((NUP Message Received == Download)
            if (jobIdentifier == job identifier from message) &&
            (NUPState == Receive)) {
                if (firmware version of download > NE firmware version) {
                    Store firmware download in memory;
                }
                else {
                    // Firmware at correct version so no action
required.
                }
                If (NE Inventory == Notification Inventory) { \\Inventory
                    upto date
                    If (ApplyImmediately flag was set) {
                        Switch NE to use new firmware in memory
                        NUPState = Listen;
                    }
                    else {
                        NUPState = PendingApply;
                    }
                }
            }
            if (NUP Message Received == Apply) {
                if ((NE Inventory == Notification Inventory) &&
                (NUPState == PendingApply)) {
                    Switch NE to use new firmware in memory
                    NUPState = Listen;
                }
                else {
                    ApplyState = ApplyImmediately;
                }
            }
            if (NUP Message Received == Inventory) {
                If ((Inventory message indicates missing firmware) &&
                (NE addressing == messages addressing)) {
                    Send NUP Download Messages for specific card
                    firmware using the original jobIdentifier;
                }
            }
        }
        if (NUP No activity timeout occurs) {
            if (NUPState == Receive) {
                Send inventory message to adjacent NE's indicating
missing firmware
            }
            else {
                // No action.
            }
        }
    }
}
```

The structure of the firmware will now be described. Some current firmware restore mechanisms supply an image containing all the firmware for the network element. This may contain several megabytes and is segmented by the underlying application and transport mechanisms.

The NUP agents act on the single image to break it into constituent sub-images. These may include for example, an image for a traffic card, an image for a switch card etc. These sub-images may be further segmented by the transport mechanism. However, a segment now only contains firmware for one type of card only. As a result, the destination NUP agent can be selective about which images to select and store in the network element's memory. The determination of which images to select and store is made by the NUP agent by comparing the list of files and versions in the notification message with the NE's present inventory. This approach has the advantage that a network element only stores firmware that it needs to update, so reducing processing load on the NE.

In a large network such as a telecoms network, it is imperative that firmware updates on network elements must have a high reliability to prevent loss of service. This may be done either by acknowledging every message or in some other way. Acknowledging every message is undesirable and has a high impact on the network. It also increases download time. Instead of acknowledging messages, inventory messages are sent out as described with respect to FIG. 3. The inventory messages contain a list of all firmware images in a network element's memory. The destination NE, which receives the inventory message, compares the received inventory with its own listings and if it detects that any firmware is missing or, for example, that a previous version number is present, it will send the missing images to the source of the inventory message using a NUP download message.

The method and system embodying the invention have been described in terms of the firmware upgrades being sent to all appropriate network elements. There will be some exceptions. For example, if a network element is of the correct type, but already has the correct version of firmware that is being upgraded that NE will remain in the "listen" state when it receives a notification message. Thus, it examines the upgrade details in the notification message, determines that it already has that firmware and does not switch to the "receive" state.

If an NE of the correct type is being used by another user, a craft terminal or an element manager it will receive the upgrade and store it but it will not apply it until it is released from its present usage.

A NE that is already in a "receive" or "broadcast only" state will not accept a new download request until the current job is complete.

A NE in a decommissioned state will not accept downloads.

The foregoing description assumes that the network has sufficient capacity to perform the upgrades. If the network is congested, the messages will be queued until such time as they can be forwarded to the adjacent NEs.

The system user may determine the inventory of any network element by looking at that network element via an element manager or other diagnostic tool attached to the network or a specific network element.

The network upgrade protocol comprises four main portions: notification, inventory, download and apply. These will be described in turn.

Notification

The notification message is sent across the network to instruct the NEs of the type defined in the message to go into a firmware download waiting state. NEs not of the relevant type do not go into this state and remain in a "listen" state for further notification messages.

The structure of the notification message is as follows:
Header—NE type
  Job identifier
  Message length
  Checksum
Payload—Name value pairs of firmware and version respectively.
  Apply immediately flag.

The message also contains a job identifier to prevent interference from other simultaneous downloads. An apply immediately flag is used to instruct the NEs to apply the upgrade as soon as it has all been received. If this flag is set any subsequent Apply Message will be ignored.

Inventory

An inventory message is broadcast by a network element to its neighbours to indicate its firmware inventory. The structure of the message is as follows:
Header—NE type
  Job identifier
  Message length
  Checksum
Payload—Name value pairs of firmware, version respectively.

Download

This message contains the actual firmware image to be downloaded. The structure of the message is as follows:
Header—NE type
  Job identifier
  Message length
  Checksum
Payload—firmware image binary for a logical entity.

Apply

This message instructs the NEs to apply the new software. It is not required if the apply immediately flag is set in the notification message. The apply message can be sent immediately following the final download message or at a later time upon a user generated event. The structure of the message is as follows:
Header—NE type
  Job identifier
  Message length
  Checksum
Payload—Name value pairs of software and version respectively. Effective time (for deferred apply only).

Receipt of this message generates an alarm to log the fact that the firmware has changed. If the "apply immediately" flag was set in the Notification Message then this message is not required and will be ignored if sent. It may also generate an event that is sent to the NE from where the global apply was instigated.

It will be appreciated that the embodiment of the invention described is highly advantageous and enables the time required to upgrade a network to be reduced from several months to a few hours. This enables large cost savings to be made and more frequent upgrades made, which can optimise network operation. Previously only the most important and essential upgrades have been made due to the cost and difficulty of the upgrade process.

Many varieties to the embodiments described are possible without departing from the scope of the invention which is defined by the claims appended hereto. For example, although the description has been given with respect to an SDH network, the invention is not limited to any particular type of network. Similarly, the invention is not linked to the specific network protocol described and other protocols may be described to upgrade the networks.

The invention claimed is:

1. A method of upgrading firmware installed on network elements of a communications network, comprising the steps of:
  loading a firmware upgrade onto a source network element on the communications network; and
  broadcasting the firmware upgrade through the communications network to network elements to which the firmware upgrade applies, including
    sending a notification message identifying a type of the network element to which the firmware upgrade applies to network elements that are adjacent the source network element by sending the notification message from the source network element by a network upgrade protocol (NUP) software agent comprised in the source network element, broadcasting the notification message through the communications network by each network element that receives the notification message passing the notification message to the adjacent network elements, and switching the network element of the type identified in the notification message to a receiving state for receipt of the firmware upgrade upon receipt of the notification message,
  sending an apply message from the source network element to the adjacent network elements, by sending the apply message from each network element at which the apply message is received to the adjacent network elements, the apply message instructing the network elements to which the firmware upgrade applies to apply the firmware upgrade, and
  periodically sending an inventory message from a given network element to the adjacent network elements, the inventory message comprising a list of firmware stored at the given network element, and, at the adjacent network elements that receive the inventory message, comparing the received firmware list with its own firmware list and, if the comparison indicates that the given network element sending the inventory message does not have all the firmware in the receiving network element's list, sending the missing firmware to the given network element originating the inventory message.

2. The method according to claim 1, wherein the step of broadcasting the firmware upgrade through the communications network comprises sending a download message including an image of the firmware upgrade to the network elements that are adjacent the source network element, and broadcasting the download message through the communications network by each network element that receives the download message passing the download message to the adjacent network elements.

3. The method according to claim 2, wherein each network element comprises a plurality of different functions to which the firmware upgrade relates, comprising subdividing the firmware upgrade image in the download message into a plurality of sub-images according to the network element function to which the of sub-images relate.

4. The method according to claim 1, wherein the notification message includes a flag instructing the network elements that receive the firmware upgrade to apply the firmware upgrade immediately after the firmware upgrade has been received.

5. The method according to claim 1, wherein the inventory message includes a network element type identifier and is responded to only by the adjacent network elements of the same type.

6. The method according to claim 1, wherein the apply message includes an indication that application of the firmware upgrade is deferred to a specified time.

7. A method of upgrading firmware installed on network elements of a communications network, comprising the steps of:
   installing a protocol software agent on each network element for running a network upgrade protocol (NUP);
   installing a firmware upgrade at a source network element; and
   broadcasting the firmware upgrade through the communications network to network elements to which the firmware upgrade applies by applying the NUP at each network element, the broadcasting step including
      sending a notification message identifying a type of the network element to which the firmware upgrade applies to network elements that are adjacent the source network element by sending the notification message from the source network element by a NUP software agent comprised in the source network element,
      broadcasting the notification message through the communications network by each network element that receives the notification message passing the notification message to the adjacent network elements, and the step of switching the network element of the type identified in the notification message to a receiving state for receipt of the firmware upgrade upon receipt of the notification message,
      sending an apply message from the source network element to the adjacent network elements, by sending the apply message from each network element at which the apply message is received to the adjacent network elements, the apply message instructing the network elements to which the firmware upgrade applies to apply the firmware upgrade, and
      periodically sending an inventory message from a given network element to the adjacent network elements, the inventory message comprising a list of firmware stored at the given network element, and, at the adjacent network elements that receive the inventory message, comparing the received firmware list with its own firmware list and, if the comparison indicates that the given network element sending the inventory message does not have all the firmware in the receiving network element's list, sending the missing firmware to the given network element originating the inventory message.

8. A communications network, comprising:
   a plurality of network elements, each network element having a network upgrade protocol (NUP) software agent for receiving a network upgrade from adjacent network elements, broadcasting a received network upgrade to the adjacent network elements, upgrading firmware of the network elements according to content of the network upgrade, sending to the network elements that are adjacent to a respective network element a notification message identifying a type of the network element to which the network upgrade applies, and switching the network element of the type identified in the notification message to a receiving state for receipt of the network upgrade upon receipt of the notification message, the NUP software agent comprising a transmitter for sending an inventory of firmware stored at the NUP software agent to the adjacent network elements on the communications network, and a receiver for receiving an inventory from an adjacent network element on a communications element, for comparing the received inventory with its own inventory and, if the received inventory contains items not in its own inventory, identifying those items to the network element from which the inventory was received.

9. A network element for a communications network, the network element being operative for sending and receiving messages to and from other network elements in the communications network, comprising:
   a memory; and
   a network upgrade protocol (NUP) software agent for receiving a network upgrade from at least one adjacent network element on the communications network, for broadcasting a received network upgrade to the at least one adjacent network element on the communications network, for upgrading firmware of the network element according to content of the network upgrade, for sending to the at least one adjacent network element a notification message identifying a type of the network element to which the network upgrade applies, and for switching the network element of the type identified in the notification message to a receiving state for receipt of the network upgrade upon receipt of the notification message, the NUP software agent comprising a transmitter for sending an inventory of firmware stored at the NUP software agent to the adjacent network elements on the communications network, and a receiver for receiving an inventory from an adjacent network element on a communications element, for comparing the received inventory with its own inventory and, if the received inventory contains items not in its own inventory, identifying those items to the network element from which the inventory was received.

10. An apparatus for upgrading firmware installed on network elements of a communications network, comprising:
    a loader for loading a firmware upgrade onto a source network element on the communications network; and
    a broadcaster for broadcasting the firmware upgrade through the communications network to network elements to which the firmware upgrade applies, the broadcaster being operative for sending a notification message identifying a type of the network element to which the firmware upgrade applies to network elements that are adjacent to the source network element by sending the notification message from the source network element by a network upgrade protocol (NUP) software agent comprised in the source network element, and for broadcasting the notification message through the communications network by each network element that receives the notification message passing the notification message to the adjacent network elements, the NUP software agent comprising a transmitter for sending an inventory of firmware stored at the NUP software agent to the adjacent network elements on the communications network, and a receiver for receiving an inventory from an adjacent network element on a communications element, for comparing the received inventory with its own inventory and, if the received inventory contains items not in its own inventory, identifying those items to the network element from which the inventory was received.

11. The apparatus according to claim 10, wherein the NUP software agent is operative for breaking a firmware image into a plurality of functional sub-images.

12. The apparatus according to claim 11, wherein the NUP software agent is operative for examining a NUP message to determine whether message content is relevant to the network element.

13. The apparatus according to claim 12, wherein the NUP software agent is operative for changing a state of the NUP software agent, on receipt of a network upgrade protocol message relevant to the network element, whereby the network element receives and stores the firmware upgrade.

14. The apparatus according to claim 10, wherein the NUP software agent is operative for applying a received firmware in respect to an apply message.

15. A network upgrade method of upgrading firmware stored in network elements of a communications network, the method comprising the steps of:

- sending a notification message identifying a type of the network element to be upgraded by sending the notification message from a source network element by a network upgrade protocol (NUP) software agent comprised in the source network element, and switching the network element of the type identified in the notification message to a receiving state for receipt of a firmware upgrade upon receipt of the notification message,
- sending a download message for downloading the firmware upgrade to the network elements of the identified type,
- sending an apply message from the source network element to the adjacent network elements, by sending the apply message from each network element at which the apply message is received to the adjacent network elements, the apply message instructing the network elements to which the firmware upgrade applies to apply the firmware upgrade, and
- periodically sending an inventory message from a given network element to the adjacent network elements, the inventory message comprising a list of firmware stored at the given network element, and, at the adjacent network elements that receive the inventory message, comparing the received firmware list with its own firmware list and, if the comparison indicates that the given network element sending the inventory message does not have all the firmware in the receiving network element's list, sending the missing firmware to the given network element originating the inventory message.

* * * * *

UNITED STATES PATENT AND TRADEMARK OFFICE
CERTIFICATE OF CORRECTION

| | |
|---|---|
| PATENT NO. | : 7,992,142 B2 |
| APPLICATION NO. | : 10/491257 |
| DATED | : August 2, 2011 |
| INVENTOR(S) | : Hartshorne et al. |

Page 1 of 1

It is certified that error appears in the above-identified patent and that said Letters Patent is hereby corrected as shown below:

On the Face Page, in Field (75), under "Inventors", in Column 1, Line 2, delete "West Brideford" and insert -- West Bridford --, therefor.

In Column 3, Line 18, delete "a in-band" and insert -- an in-band --, therefor.

Signed and Sealed this
Tenth Day of January, 2012

David J. Kappos
*Director of the United States Patent and Trademark Office*